United States Patent Office 3,427,524
Patented Feb. 11, 1969

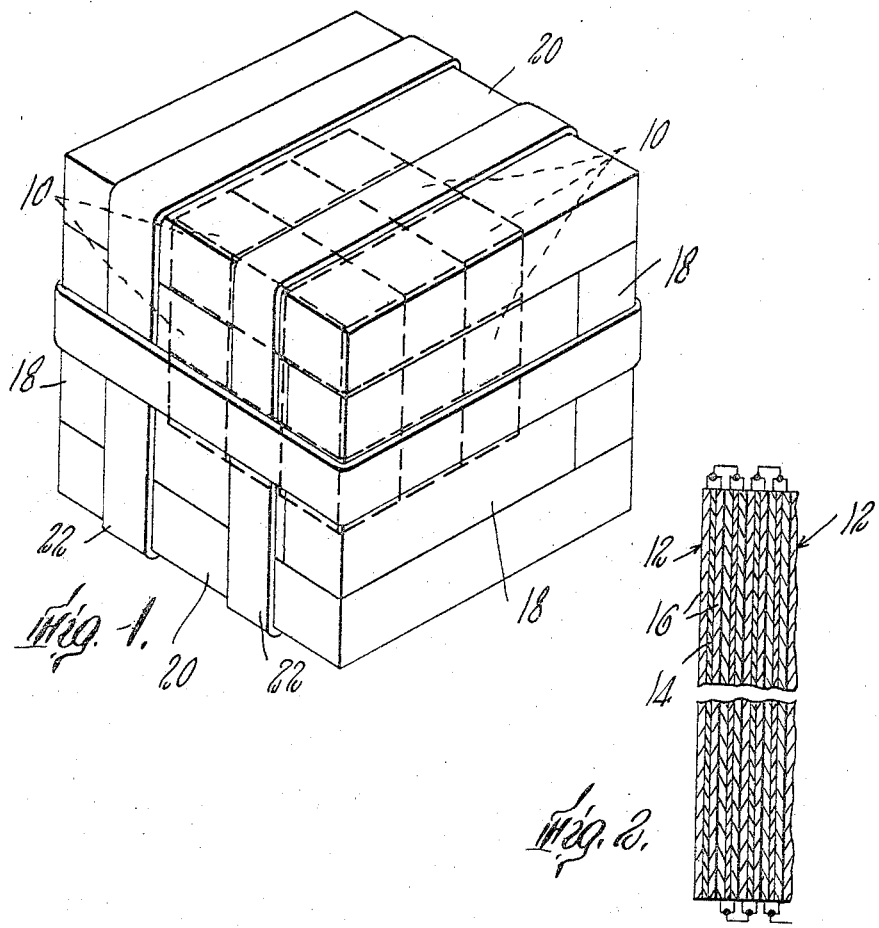
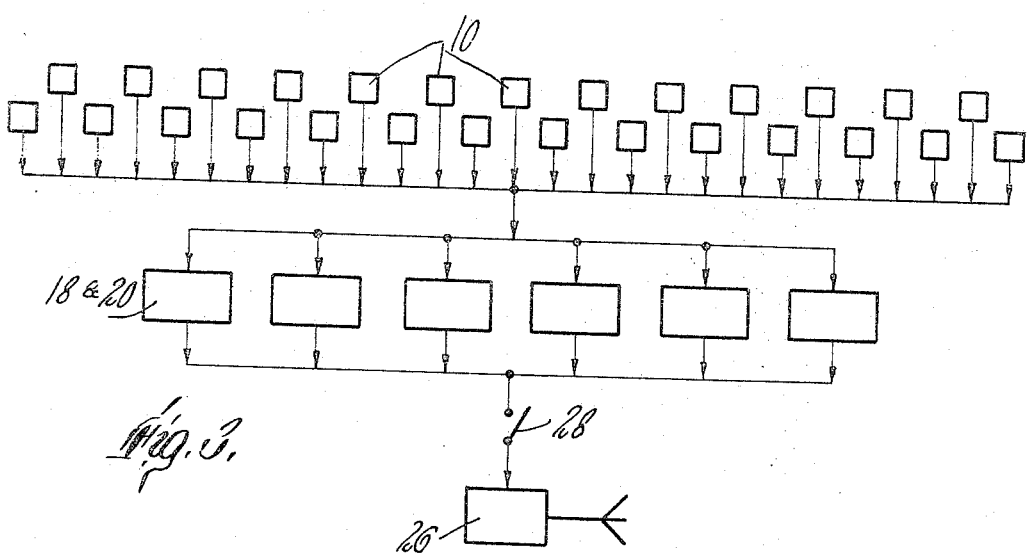

3,427,524
SELF-CONTAINED SHIELD FOR RADIOACTIVE GENERATOR BATTERY CHARGER
Frederic Samuel Tobey, Walpole, Mass., assignor to W. H. Brady Co., Milwaukee, Wis., a corporation of Wisconsin
Filed Dec. 21, 1965, Ser. No. 515,355
U.S. Cl. 320—61
Int. Cl. H02j 7/00; G21d 7/00
5 Claims

ABSTRACT OF THE DISCLOSURE

A self-contained electrical energy generator and one or more electrochemical storage batteries electrically connected to the generator for collection of the output thereof for intermittent delivery at a higher energy delivery rate than that of which the generator alone is capable, the generator being radioactive and the battery providing at least in part the shielding necessary to make handling of the power pack safe.

---

This invention relates to a self-contained power pack for intermittent delivery of electrical energy.

It is a primary object of the invention to provide a power pack which, without outside assistance, generates electrical energy at a first rate and stores it in one or more electrochemical storage batteries for delivery at a second, higher rate. A further important object is to provide, in preferred embodiments improved ratios of capacity to bulk and weight, by using the storage batteries to provide shielding for a radioactive generating source, and long life and utility without outside source of energy.

The invention features provision in a single unit of a self-contained electrical energy generator and one or more electrochemical storage batteries electrically connected to said generator for collection of the output thereof for intermittent delivery, at a higher energy delivery rate than that of which the generator alone is capable. In preferred embodiments, there is featured an arrangement of batteries and generator such that the latter is radioactive and the former provide at least in part the shielding necessary to make handling of the power pack safe.

Other objects, features, and advantages will appear from the following description of a preferred embodiment of the invention, taken together with the attached drawings thereof, in which:

FIG. 1 is a diagrammatic perspective view of the presently preferred embodiment of the invention;
FIG. 2 is an enlarged vertical sectional view, partially broken away, of a portion of said preferred embodiment; and
FIG. 3 is a circuit diagram of said embodiment.

There is shown in the drawings twenty-seven two-inch cubes, each indicated generally at 10. Each cube is a small electrical energy source made up of twenty-four atomic batteries, each indicated generally at 12. Each battery 12 contains a thin strontium 90-containing layer 14, which emits beta radiation, and two silicon solar cells 16. Each battery 12 is in size two inches by two inches by 1/24 inch, and the twenty-four batteries of each cube 10 are connected in series.

The twenty-seven cube energy sources 10 are connected electrically in parallel to deliver electrical energy to the six closed lead-acid storage batteries 18 and 20, which are also connected electrically parallel. Each battery 18 and 20 includes throughout about three-quarters of an inch in total thickness of lead, and the batteries are held together in overlapping relation by straps 22. Each battery 18 and 20 is of 2.5 ampere-hour capacity.

In operation, each source 10 delivers 10 microwatts at six volts, so that the entire generator (of 27 cubes 10) delivers 270 microwatts at six volts. This provides sufficient energy to operate one-quarter watt radio transmitter 26 on a 2.5% duty cycle, to transmit weather information from a remote geographical location, the transmitter being energized and de-energized by means of radio-controlled switch 28. The embodiment is also capable of delivery of even higher wattages for short periods of time with lowered percentage duty cycles.

Other embodiments will occur to those skilled in the art and are within the following claims.

I claim:
1. A power pack comprising a self-contained generator of electricity through radioactive emission and at least one electrochemical storage battery, said generator being capable of producing electrical energy at a first rate and said storage battery being capable of delivering electrical energy at a second rate, said generator being connected to deliver energy to said storage battery for storage, said second rate being greater than said first rate, and said battery providing at least a portion of the shielding of the generator radiation.
2. The power pack of claim 1 in which all the shielding required to protect against said radiation is provided by one or more electrochemical storage batteries charged by said generator.
3. The power pack of claim 2 in which any said battery is a closed lead acid battery.
4. The power pack of claim 1 which comprises a multiplicity of energy subsources connected electrically in parallel, each of said subsources comprising a multiplicity of atomic batteries connected electrically in series.
5. The power pack of claim 4 which includes a plurality of electrochemical storage batteries, said batteries being connected electrically in parallel.

References Cited
UNITED STATES PATENTS
3,049,709   8/1962   Rianhard.
FOREIGN PATENTS
1,003,045   9/1965   Great Britain.

JOHN F. COUCH, Primary Examiner.
S. WEINBERG, Assistant Examiner.

U.S. Cl. X.R.
310—3